Jan. 14, 1958 E. F. MANGIS 2,819,710
KNIFE EQUALIZER FOR STONECUTTER
Filed July 17, 1957 2 Sheets-Sheet 1
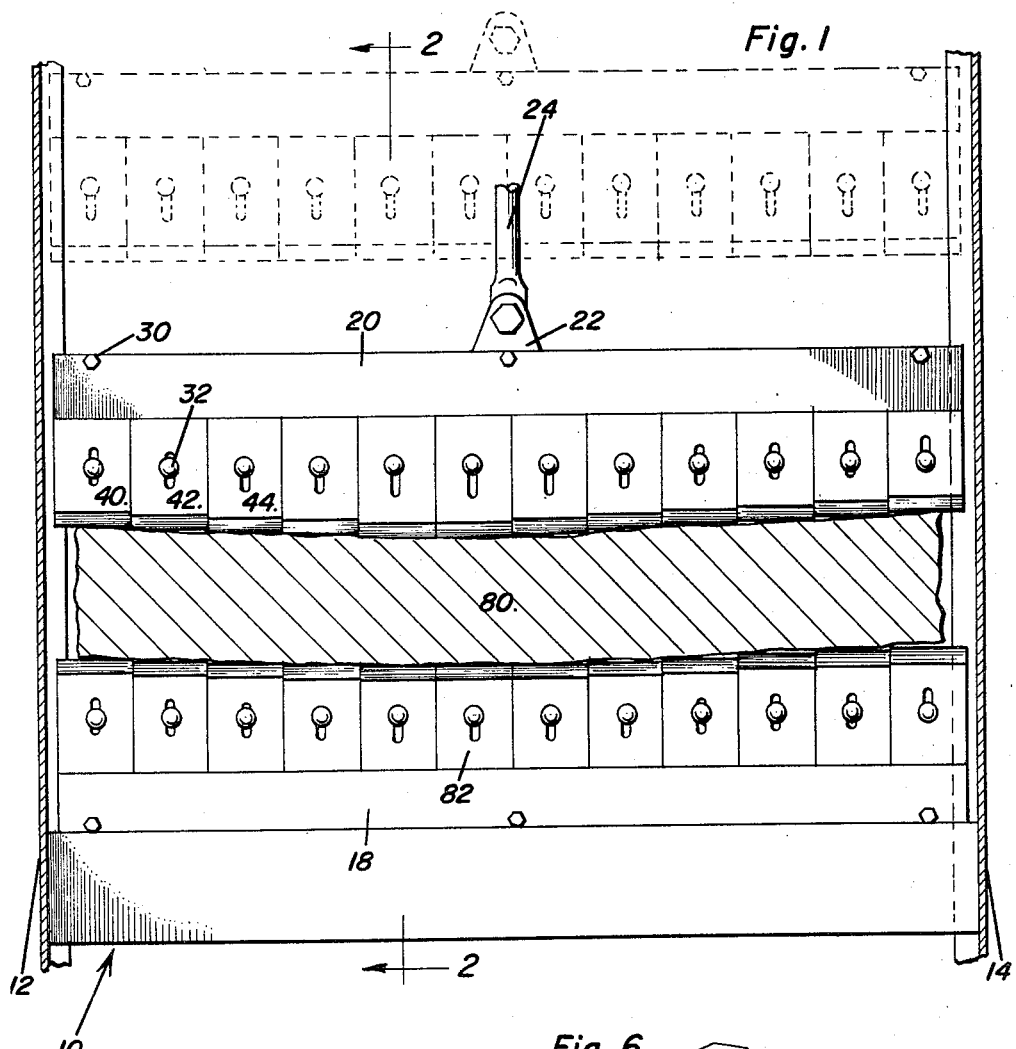
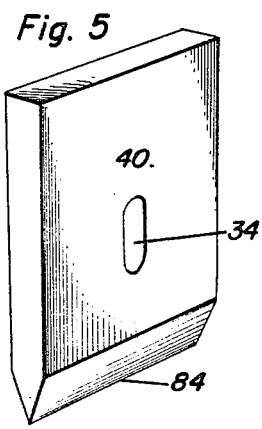
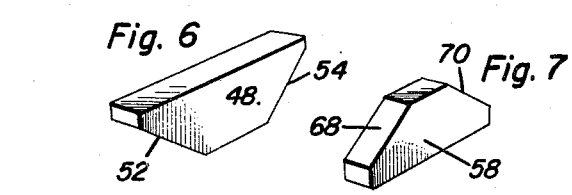
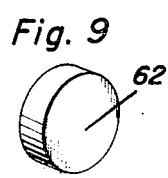
Elmer F. Mangis
INVENTOR.

Jan. 14, 1958   E. F. MANGIS   2,819,710
KNIFE EQUALIZER FOR STONECUTTER
Filed July 17, 1957   2 Sheets-Sheet 2
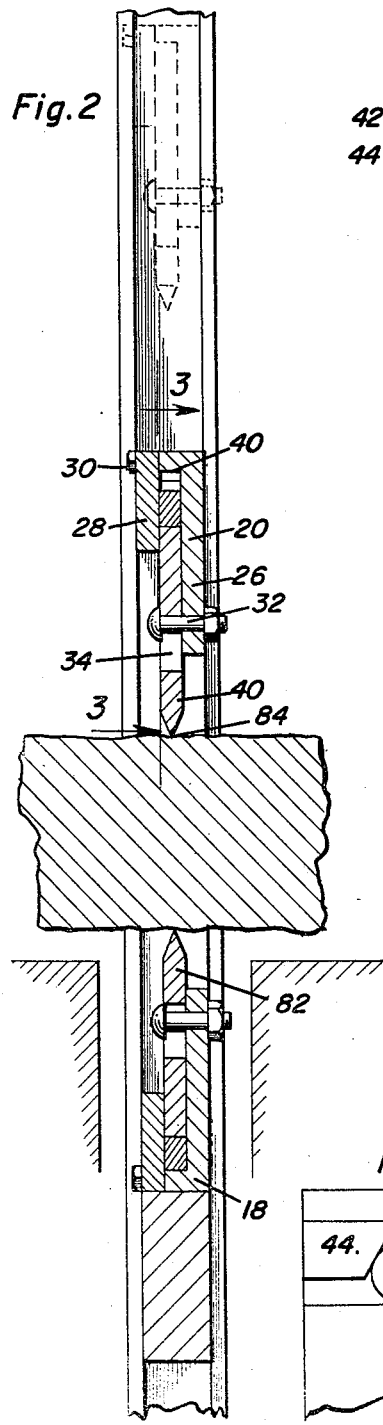
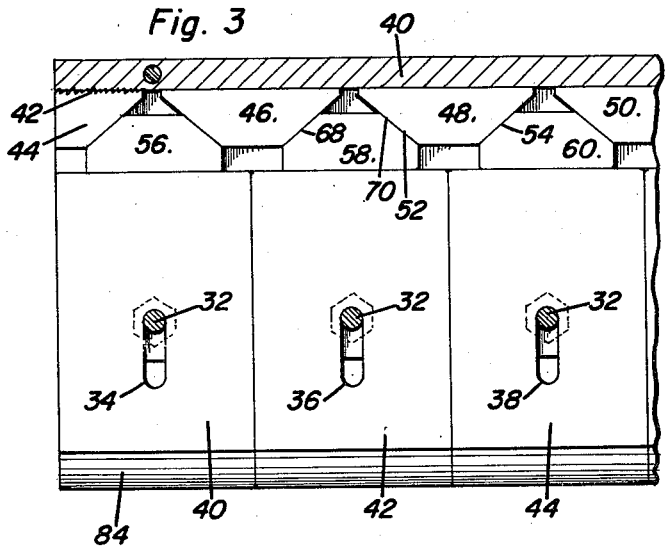
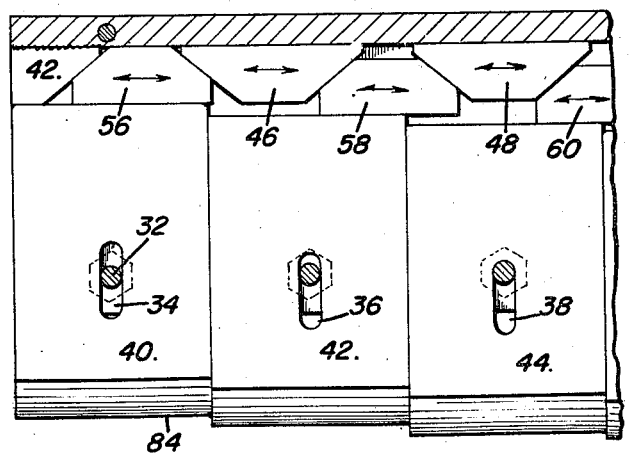
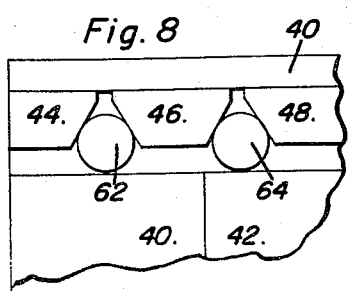
Elmer F. Mangis
INVENTOR.

United States Patent Office 2,819,710
Patented Jan. 14, 1958

2,819,710

KNIFE EQUALIZER FOR STONECUTTER

Elmer F. Mangis, Frankfort, Ind.

Application July 17, 1957, Serial No. 672,478

6 Claims. (Cl. 125—23)

This invention relates to means for adjusting a plurality of knives of a stonecutter and has for its primary object to allow knives to adjust themselves to bear evenly throughout the entire length of a stone being cut even though the contours of the stone are irregular.

Another important object of the present invention resides in the provision of means for adjusting the upper and lower sets of blades in an automatic manner so that the knife blades need not be manually adjusted for each successive cutting operation.

The construction of this invention features the use of a first set of wedges which cooperates with a second set of wedges or rollers so as to vertically and horizontally position the second set of rollers with respect to the knives whereby the knives will have their cutting edges held against the stone so that the knives will bear evenly the entire length of the stone eliminating cross breaking.

Still further objects and features of this invention reside in the provision of a knife equalizer for stonecutter that is simple in construction, capable of being utilized on various types of stonecutters, which is inexpensive to manufacture and easy to install.

These, together with the various ancillary objects and features of the invention which will become apparent as the following description proceeds, are attained by this knife equalizer for a stonecutter, a preferred embodiment of which has been illustrated in the accompanying drawings, by way of example, only wherein:

Figure 1 is a vertical sectional detail view of a stonecutter illustrating the arrangement of knives for cutting a stone of irregular contour;

Figure 2 is a vertical sectional view as taken along the plane of line 2—2 of Figure 1 and illustrating an enlarged scale of the construction of the present invention;

Figure 3 is a sectional detail view as taken along the plane of line 3—3 in Figure 2 and showing an enlarged scale of the position of the knives and wedges with the knives in an initial and evenly positioned arrangement;

Figure 4 is a sectional detail view similar to that of Figure 3 but illustrating the knives arranged to compensate for the contours of an irregular stone;

Figure 5 is a perspective view of one of the knives utilizing the present invention;

Figure 6 is a perspective view of one of the wedges employed in the invention;

Figure 7 is a perspective view of one of the wedges which may be utilized complementary to the wedges shown in Figure 6;

Figure 8 is a partial elevational view of the modified form of the invention employing those in lieu of a second set of wedges; and Figure 9 is a perspective view of one of the rollers which may be employed in the invention.

With continuing reference to the accompanying drawings wherein like reference numerals designate similar parts throughout the various, reference numeral 10 is used to generally designate the stonecutter comprising the present invention which may include a pair of spaced channel-shaped supports 12 and 14 and which may have a fixed frame bar 18 as well as a movable frame bar 20 with the movable frame bar 20 having a bracket 22 attached thereto to which a rod 24 is adapted to be connected, the rod being connected to hydraulic or other means for moving the movable frame bar 20 for operation of the stonecutter.

The frame bars 18 and 20 and the associated sets of knives may be mere images of each other with the exception of the fact that the frame bar 18 is fixedly secured in position. It is to be recognized that the terms "horizonttal" and "vertical" are utilized with respect to the embodiment of the invention illustrated, it being realized that the plane of action of the invention can be horizontal as well as that of the vertical plane shown and that the aforesaid terms only serve to orient the parts of the stonecutter and not necessarily the position or relative arrangement of parts to the claims specified.

The frame bar 20 is formed of two parts, a substantially inverted L-shaped member 26 having a front frame plate 28 bolted or otherwise fastened thereto as at 30. The L-shaped member 26 carries a plurality of guide bolts 32 or rods which extend through slots as at 34, 36 and 38 in a plurality of knife blades as indicated at 40, 42, 44, etc.

It is noted that the L-shaped member has a portion 40 spacing the plate 28 from the other portions of the member 26 thereby forming space for reception of the knife blades 40, 42, 44 etc. Fixed to the portion 40 as by welding as at 42 are fixed wedges 44 on either end of the frame bar 20. Movable wedges as at 46, 48, 50, etc., are movable horizontally with respect to each other and with respect to the frame bar 20 and include tapering surfaces as at 52, 54, for the wedge 48, see Figures 3 and 6. Of course, the wedges 46, 48, 50, etc., may be of other suitable shapes so long as the wedging automatic adjusting action is of the nature as will be understood as the following description proceeds.

Engaging the tapering surfaces 52 and 54 is another set of wedges 56, 58 and 60 or as shown in Figure 8, a plurality of rollers as at 62 and 64. The wedges 56, 58, and 60 have corresponding tapering surfaces 68 and 70 which cooperate with the tapered surfaces of the wedges 46, 48, 50, etc. in such manner that the wedges 56, 58 and 60 will permit the knife blades 40, 42 and 44 to position themselves to bear evenly the entire length of the stone such as indicated at 80 to be cut. It is noted that in the arrangement as is shown in Figure 4, in order that the blade 40 will be raised above the blades 42 and 44, the wedge 56 moves upwardly moving the wedge 46 to the right in turn moving the wedge 58 slightly to the right and moving the wedge 48 somewhat to the right. It is noted that the wedges 58 and 60 are correspondingly vertical offset so as to compensate somewhat for the horizontal dislocation of the wedge 46 and 48, etc., it being noted that the lower the position of the wedges 56 and 58 are the farther the wedges 46, 48 can be spaced form each other. It is noted that when the wedges for the central and most depressed portions are adjusted, they will be in abutting relationship relative to each other inasmuch as the lower set of wedges would then be depressed downwardly the greatest extent. In this manner, the knives can be positioned as can be seen in Figure 1 so as to bear against the stone and eliminate cross breaking. A lower set of knives as indicated at 82 is arranged much in the same manner whereby the stone 80 can be conveniently cut.

It is noted that the blades as at 40, 42 and 44 are provided with suitable cutting edges as at 84. In lieu of the wedges 56, 58 and 60, of course the rollers 62 and 64 will function much in the same manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A knife equalizer for a stonecutting apparatus comprising a frame, a plurality of knives vertically adjustably carried by said frame, a set of wedges mounted on said frame and including a pair of spaced end wedges fixedly secured to said frame and a plurality of other wedges horizontally movable with respect to said frame, and movable means engageable with said wedges and said knives interspaced between said wedges of said set of wedges holding said knives in vertically adjusted position.

2. A knife equalizer for a stonecutting apparatus comprising a frame, a plurality of knives vertically adjustably carried by said frame, a set of wedges mounted on said frame and including a pair of spaced end wedges fixedly secured to said frame and a plurality of other wedges horizontally movable with respect to said frame, and movable means engageable with said wedges and said knives interspaced between said wedges of said set of wedges holding said knives in vertically adjusted position, said movable means being horizontally and vertically movable with respect to said frame.

3. A knife equalizer for a stonecutting apparatus comprising a frame, a plurality of knives vertically adjustably carried by said frame, a set of wedges mounted on said frame and including a pair of spaced end wedges fixedly secured to said frame and a plurality of other wedges horizontally movable with respect to said frame, and movable means engageable with said wedges and said knives interspaced between said wedges of said set of wedges holding said knives in vertically adjusted position, said movable means being horizontally and vertically movable with respect to said frame, said movable means comprising a second set of wedges.

4. A knife equalizer for a stonecutting apparatus comprising a frame, a plurality of knives vertically adjustably carried by said frame, a set of wedges mounted on said frame and including a pair of spaced end wedges fixedly secured to said frame and a plurality of other wedges horizontally movable with respect to said frame, and movable means engageable with said wedges and said knives interspaced between said wedges of said set of wedges holding said knives in vertically adjusted position, said movable means being horizontally and vertically movable with respect to said frame, said movable means comprising a set of rollers.

5. A knife equalizer for a stonecutting apparatus comprising a frame, a plurality of knives vertically adjustably carried by said frame, a set of wedges mounted on said frame and including a pair of spaced end wedges fixedly secured to said frame and a plurality of other wedges horizontally movable with respect to said frame, and movable means engageable with said wedges and said knives interspaced between said wedges of said set of wedges holding said knives in vertically adjusted position, said knives having slots therein, guide rods secured to said frame extending through said slots.

6. A knife equalizer for a stonecutting apparatus comprising a frame, a plurality of knives vertically adjustably carried by said frame, a set of wedges mounted on said frame and including a pair of spaced end wedges fixedly secured to said frame and a plurality of other wedges horizontally movable with respect to said frame, and movable means engageable with said wedges and said knives interspaced between said wedges of said set of wedges holding said knives in vertically adjusted position, said knives having slots therein, guide rods secured to said frame extending through said slots, said movable means being horizontally and vertically movable with respect to said frame, said movable means comprising a second set of wedges.

References Cited in the file of this patent

UNITED STATES PATENTS 2,557,098    Graham et al. _____ June 19, 1951